United States Patent [19]

Camp

[11] Patent Number: 4,575,114
[45] Date of Patent: Mar. 11, 1986

[54] VEHICLE SUSPENSION JOINT

[75] Inventor: John W. A. Camp, Colchester, United Kingdom

[73] Assignee: Ford Motor Company, Dearborn, Mich.

[21] Appl. No.: 610,216

[22] Filed: May 14, 1984

[30] Foreign Application Priority Data

Oct. 31, 1983 [GB] United Kingdom ............... 8329042

[51] Int. Cl.⁴ .............................................. B60G 7/02
[52] U.S. Cl. .................................. 280/673; 280/688; 280/689; 267/141
[58] Field of Search ............... 280/668, 670, 673, 692, 280/696, 724, 689, 671; 267/141

[56] References Cited

U.S. PATENT DOCUMENTS 4,139,246 2/1979 Mikoshiba et al. ................. 280/673
4,252,339 2/1981 Shimizu et al. ..................... 280/673

FOREIGN PATENT DOCUMENTS 213019 3/1924 United Kingdom .
1356106 6/1974 United Kingdom .

Primary Examiner—Richard A. Bertsch
Attorney, Agent, or Firm—Jerome R. Drouillard; Roger L. May

[57] ABSTRACT

A joint between a stabilizer bar 10 and a front wheel track control arm 14 has a compliance device using rubber insulators 16. The insulators are held in place on the stabilizer bar by retainers 18, 20 and plastic discs 30, 32 are included between the retainers and the insulators to reduce wear. It is preferred for the discs to be rotatable on the stabilizer bar.

14 Claims, 1 Drawing Figure

U.S. Patent   Mar. 11, 1986   4,575,114
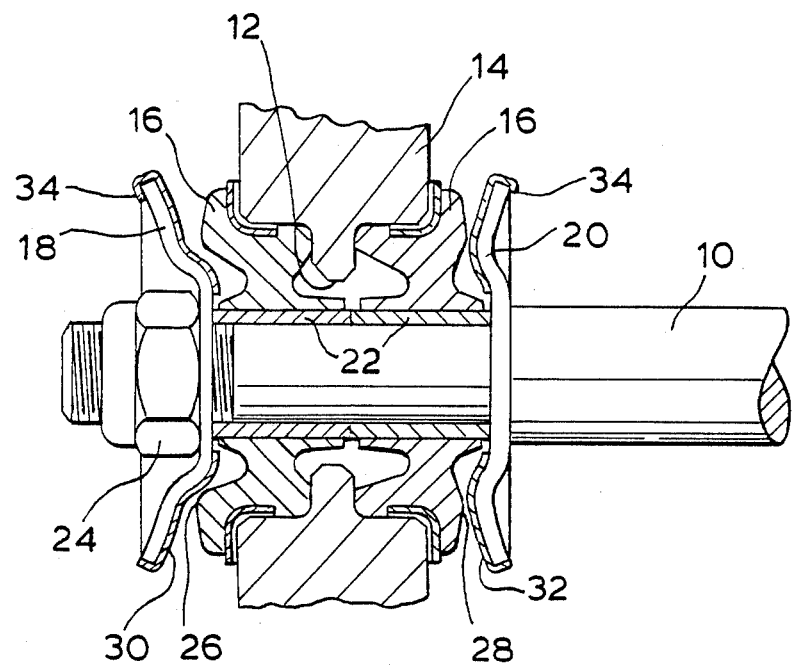

VEHICLE SUSPENSION JOINT

This invention relates to a vehicle suspension joint and is particularly, but not exclusively, suitable for use between a stabilizer bar and a track control arm of a front wheel suspension.

According to the present invention, there is provided a vehicle suspension joint between a suspension arm and a bar which passes through an aperture in the arm, wherein a compliant insulator is provided between the bar and the walls of the aperture and retainer discs are mounted on respective sides of the insulator to keep the insulator in position, plastic discs being provided between the retainers and the insulator.

The plastic discs are preferably free to rotate about the bar and preferably conform to the contours of the retainer discs. To facilitate assembly, the discs may clip on to the periphery of the retainers.

The discs are preferably of high density polyethylene.

The invention will now be further described by way of example, with reference to the accompanying drawing which shows, mostly in cross-section, a suspension joint in accordance with the invention.

A stabilizer bar 10 passes through an aperture 12 in a track control arm 14. Compliant rubber insulators 16 are mounted on the bar and enter the aperture 12 from each side. A front retainer disc 18 and a rear retainer disc 20 hold in place metal sleeves 22 to which the insulators 16 are bonded. The whole assembly is held together on the end of the bar 10 by a locknut 24.

The rubber insulators 16 are useful in cushioning transmission of wheel vibration to the vehicle. When the wheels ride over bumps, the rubber deforms and the flanges 26, 28 can rub against the metal retainers 18, 20 and produce unwelcome noise.

The inclusion of plastic discs 30, 32 between the insulators and the retainers satisfactorily prevents this noise. Since the discs can rotate about the stabilizer bar 10, wear on the flanges 26, 28, which normally occurs on contact between the flanges and the fixed retainers 18, 20, is substantially reduced.

To facilitate assembly, the discs 30, 32 have lips 34 at spaced positions around their circumference which can be snapped over the rims of the retainers, so that each disc and retainer can be assembled on the stabilizer bar as a single part.

The following TABLE 1 provides the results of a study which compared the effectiveness, durability and effect on the flanges of the rubber insulators of different ways of reducing squeak and wear.

TABLE 1

| TYPE | MATERIAL | EFFECTIVENESS | RIG DURABILITY | EFFECT ON FLANGE | REMARKS |
|---|---|---|---|---|---|
| COATED RETAINER | PTFE SPRAY VARIOUS SOURCES | 10% | NOT TESTED | NA | 6 APPRAISALS |
|  | MOS$_2$ | 10-20% |  | NA | 2 APPRAISALS |
|  | H.D. POLYTHENE | 100%* | 30% ∅ | MARGINAL IMPROVEMENT | ∅ ONE TEST *SHORT APPRAISAL |
| GREASE | SLMIC 9104A | 100%* | 90% | REASONABLE IMPR. | *LIFE LIMITED |
| COATED INSULATOR | PTFE | 60% | NOT TESTED COATING COULD BE SCRATCHED OFF BY FINGER NAIL | NA | ONE APPRAISAL |
| PLASTIC DISC | RAILKO PV 102 (H.D. POLYTHENE) | 100% | 95% ∅ | CONSIDERABLE IMPROVEMENT | ∅ ELEVEN TESTS 2 SETS SURVIVED 2 TESTS EACH |

I claim:

1. A vehicle suspension joint between a suspension arm and a bar which passes through an aperture in the arm, wherein a compliant insulator is provided between the bar and the walls of the aperture and retainer discs are mounted on respective sides of the insulator to keep the insulator in position, plastic discs being provided between the retainers and the insulator.

2. A joint as claimed in claim 1 wherein the plastic discs conform to the contour of the retainer.

3. A joint as claimed in claim 2 wherein the plastic discs clip onto the periphery of the retainer.

4. A joint as claimed in claim 3 wherein the plastic discs comprise high density polyethylene.

5. A joint as claimed in claim 2 wherein the plastic discs comprise high density polyethylene.

6. A joint as claimed in claim 1, wherein the plastic discs are free to rotate about the bar.

7. A joint as claimed in claim 6 wherein the plastic discs conform to the contour of the retainer.

8. A joint as claimed in claim 7 wherein the plastic discs clip onto the periphery of the retainer.

9. A joint as claimed in claim 8 wherein the plastic discs comprise high density polyethylene.

10. A joint as claimed in claim 7 wherein the plastic discs comprise high density polyethylene.

11. A joint as claimed in claim 6 wherein the plastic discs comprise high density polyethylene.

12. A joint as claimed in claim 1 wherein the plastic discs clip onto the periphery of the retainer.

13. A joint as claimed in claim 12 wherein the plastic discs comprise high density polyethylene.

14. A joint as claimed in claim 1 wherein the plastic discs comprise high density polyethylene.

* * * * *